E. A. BROWNING.
WINDOW CLEANER.
APPLICATION FILED OCT. 8, 1917.
1,304,736. Patented May 27, 1919.
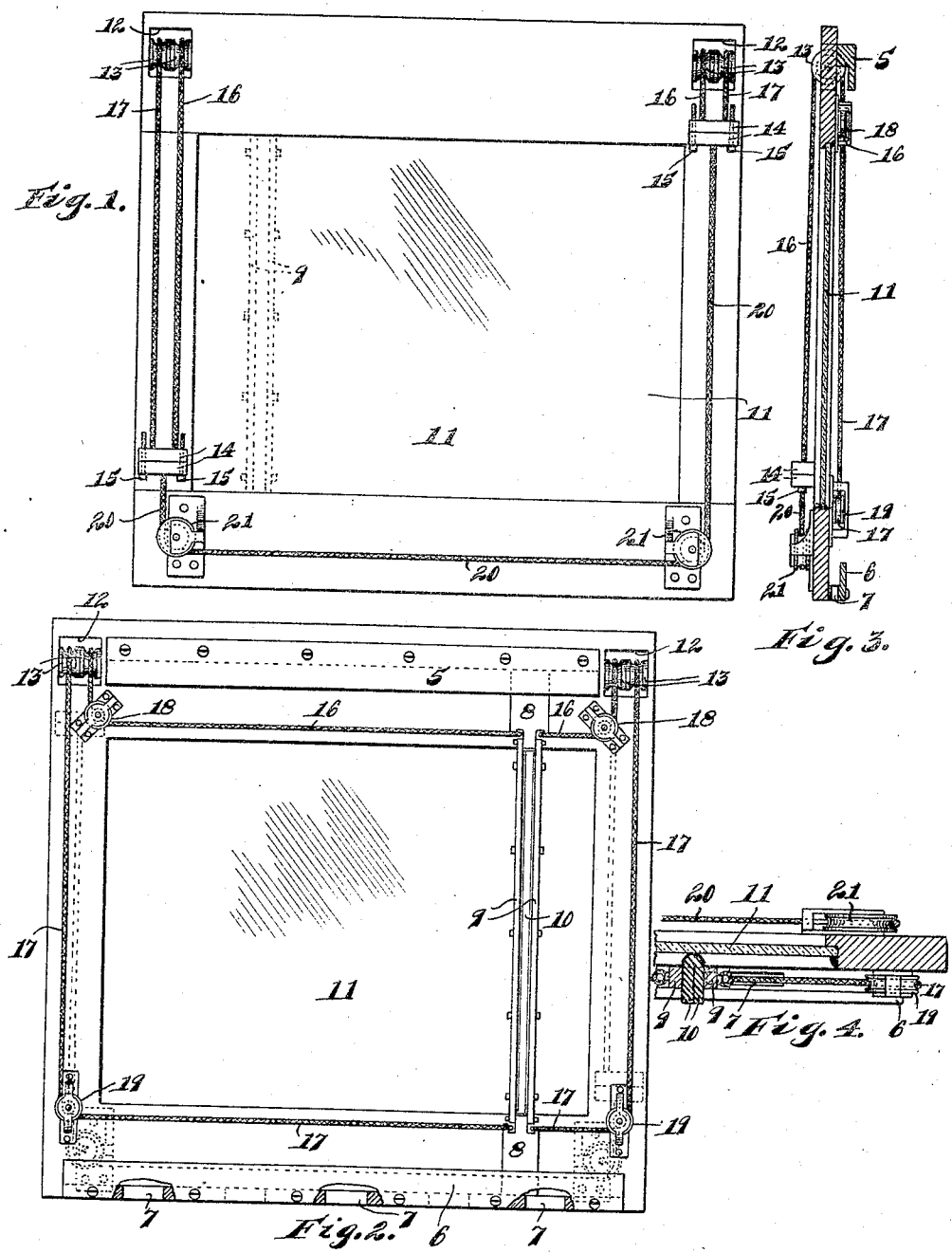
Witnesses:
C. E. Wessels.
B. J. Richards.
Inventor:
Edna A. Browning,
By Joshua R. H. Potts
her Attorney.

UNITED STATES PATENT OFFICE.

EDNA A. BROWNING, OF CHICAGO, ILLINOIS.

WINDOW-CLEANER.

1,304,736.  Specification of Letters Patent.  Patented May 27, 1919.

Application filed October 8, 1917. Serial No. 195,313.

*To all whom it may concern:*

Be it known that I, EDNA A. BROWNING, a citizen of the United States, and a resident of the city of Chicago, county of Cook, and State of Illinois, have invented certain new and useful Improvements in Window-Cleaners, of which the following is a specification.

My invention relates to improvements in window wipers, and has for its object the provision of an improved device of this character especially adapted for use by motormen or the like.

The invention consists in the combinations and arrangements of parts hereinafter described and claimed.

The invention will be best understood by reference to the accompanying drawings forming a part of this specification, and in which, Figure 1 is an interior face view of a window equipped with a construction embodying my invention, Fig. 2, an exterior face view of the same, Fig. 3, a vertical section of the same, and Fig. 4, a partial horizontal section of the same.

The preferred form of construction as illustrated in the drawings, comprises guide members 5 and 6, located at the top and bottom on the outer side of the window, the guide member 6 being equipped with drain openings 7 as shown. Guide blocks 8 are arranged to slide in the guides 5 and 6 and are connected by clamping bars 9, clamping a wiper member 10 in the form of a strip of rubber or the like, folded upon itself with the folded edge contacting with the window glass 11. Openings or passages 12 are formed in the upper corners of the window frame and double pulleys 13 mounted in said passages. Handle members in the form of two blocks 14, adjustably secured together by means of adjusting screws 15, are oppositely arranged on the inner side of the window frame, said blocks being connected by cables 16 and 17 with the wiper support. The cables 16 are led over the corresponding pulleys 13 and then under guide pulleys 18 on the inner side of the window frame and are then connected with opposite sides of the upper guide block 8. Likewise the cables 17 are led over the pulleys 13 and under guide pulleys 19, and are connected on opposite sides of the lower guide block 8. The handle blocks 14 are connected together by means of a cable 20 passing under guide pulleys 21, as shown.

By this arrangement it will be observed that by depressing the proper handle block 14, the wiper member 10 will be caused to traverse the window glass, thus removing snow, water or other material interfering with clear vision. Such depression of one block automatically lifts the other block to operative position, so that depression of said other block automatically wipes the window in the opposite direction and returns the parts to initial position. Ordinarily, operation of the wiper once in either direction will be sufficient for the purpose although the operation may be repeated a number of times if found necessary.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

The combination of pulleys adapted to be mounted in corresponding openings located at the upper corners of a window frame; a substantially vertically positioned wiper arranged to reciprocate horizontally across the outer face of said frame; cables secured to the opposite sides of said wiper at both the upper and lower ends thereof, the pair of cables on each side of said wiper being passed thence through the corresponding opening in said frame and over the corresponding pulley, there being suitable guide pulleys on the outer side of said frame; handle members secured to each pair of cables on the inner side of said frame; guide pulleys mounted at the lower corners of the inside of said frame; and a cable secured to said handle members and passed over said guide pulleys to compel simultaneous movement of said handle members in opposite directions, substantially as described.

In testimony whereof I have signed my name to this specification in the presence of two subscribing witnesses.

EDNA A. BROWNING.

Witnesses:
 JOSHUA R. H. POTTS,
 JANET E. FARRELL.

Copies of this patent may be obtained for five cents each, by addressing the "Commissioner of Patents, Washington, D. C."